United States Patent
McGuire

(10) Patent No.: US 7,128,129 B2
(45) Date of Patent: Oct. 31, 2006

(54) INVESTMENT CASTING SLURRY COMPOSITION AND METHOD OF USE

(75) Inventor: Daniel S. McGuire, Oregon, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 279 days.

(21) Appl. No.: 10/697,378

(22) Filed: Oct. 30, 2003

(65) Prior Publication Data
US 2005/0092459 A1    May 5, 2005

(51) Int. Cl.
*B22C 9/00* (2006.01)
*B28B 7/36* (2006.01)

(52) U.S. Cl. ............... 164/516; 164/517; 164/518; 164/519; 106/38.2; 106/38.9

(58) Field of Classification Search ........... 164/516, 164/519, 517, 518, 361; 106/38.9, 38.2
See application file for complete search history.

(56) References Cited

U.S. PATENT DOCUMENTS

| | | | | |
|---|---|---|---|---|
| 3,165,799 A * | 1/1965 | Watts | ......................... | 164/7.1 |
| 3,758,317 A * | 9/1973 | Moore, Jr. et al. | ......... | 501/95.1 |
| 3,996,991 A | 12/1976 | Ugata et al. | ................... | 164/35 |
| 4,284,121 A | 8/1981 | Horton | ....................... | 164/520 |
| 4,432,798 A * | 2/1984 | Helferich et al. | .......... | 106/38.3 |
| 4,476,916 A | 10/1984 | Nusbaum | .................... | 164/519 |
| 4,533,394 A * | 8/1985 | Watts | ........................ | 106/38.2 |
| 4,814,011 A * | 3/1989 | Kamohara et al. | ....... | 106/38.51 |
| 4,919,193 A | 4/1990 | Sasaki | ....................... | 164/516 |
| 4,996,084 A | 2/1991 | Elkachouty | ................. | 427/133 |
| 5,391,606 A | 2/1995 | Doles | ......................... | 524/430 |
| 5,718,749 A | 2/1998 | Horiuchi et al. | ......... | 106/38.35 |
| 5,738,921 A * | 4/1998 | Andersen et al. | .......... | 428/36.4 |
| 5,927,379 A | 7/1999 | Yasrebi et al. | ............. | 164/518 |
| 6,013,125 A * | 1/2000 | Quraishi et al. | ......... | 106/38.35 |
| 6,020,415 A | 2/2000 | Guerra, Jr. | .................. | 524/493 |
| 6,024,163 A | 2/2000 | Springgate et al. | ......... | 164/519 |
| 6,551,396 B1 * | 4/2003 | Pineda et al. | .............. | 106/38.9 |
| 6,814,131 B1 * | 11/2004 | Vandermeer | ................ | 164/519 |

* cited by examiner

Primary Examiner—Kevin Kerns
Assistant Examiner—I.-H. Lin
(74) Attorney, Agent, or Firm—Robert J. Harter

(57) ABSTRACT

A composition and method for forming investment casting shells includes using colloidal silica, zircon flour, and fused silica in a slurry which is applied to a pattern. After the slurry is applied to the pattern, it is allowed to partially or completely solidify. After the shell has solidified, the pattern may be melted or otherwise removed. A molten material is introduced into the shell and allowed to cool to form an article. Finally, the shell is broken away or otherwise removed from the article. The improved shell slurry composition and corresponding method minimizes pattern-to-pour cycle times and is environmentally friendly.

3 Claims, 4 Drawing Sheets

INVESTMENT CASTING SLURRY COMPOSITION AND METHOD OF USE

BACKGROUND OF THE INVENTION

1. Field of the Invention

The present invention is directed to investment casting, and more particularly, to a composition for an investment casting shell and a corresponding method that minimizes "pattern-to-pour" cycle times at a significant cost savings.

2. Description of Related Art

Investment casting is commonly used to produce high quality metal products with relatively close dimensional tolerances. The investment casting process is well known and commonly practiced. Generally, an investment casting of a part is made by creating a thin-walled ceramic mold over a previously formed pattern of the part. After the mold or shell has hardened, the pattern is melted or otherwise removed from it. The ceramic shell is then filled with a molten metal and allowed to solidify. The shell is then removed to reveal the desired part. Typically, some post-process conditioning is required to finish the part. Notably, the process may also be referred to herein with one or more of the following terms including lost wax, lost pattern, ceramic shell, or precision casting.

More particularly, as noted, investment casting methods initially include constructing a pattern of the original object to be replicated. Because this pattern will later be burned or, melted out of the shell, it must be either a low melting point substrate or a combustible substrate. Such substrates may include, for example, wax, polystyrene, plastic, or synthetic rubber.

Next, a ceramic shell is formed around the pattern. This can be accomplished by a two-step process including dipping the pattern into a slurry consisting of a mixture of liquid refractory binders, then disposing a refractory powder thereon. In particular, while the pattern is still wet, dry refractory grains are sieved onto the pattern. Such refractory materials are required to ensure that the integrity of the shell remains intact once the pattern is removed under elevated temperatures. Notably, one significant drawback of conventional investment casting is that during this stage, refractory grains, such as silica, become airborne and create a respiratory hazard to the user. As such, great care must be taken in the handling and application of refractory grains. Ventilation systems and respirators are commonly used to combat the associated dangers of airborne silica. However, such capital equipment is extremely expensive and often serves as a barrier to users who otherwise would find investment casting to be a preferred method of producing their desired part, for example, artists that want to produce a single cast of a work.

It is also notable that traditional investment casting slurries must be continuously blunged to remain viable for use as a shell material. Otherwise, the slurry "settles out" and hardens, thus becoming useless. This is a further drawback in terms of in convenience and cost (blunging machinery, labor, short shelf-life, etc.), and thus an alternate slurry composition that does not require blunging would be ideal.

An additional drawback to traditional methods is that they require the pattern to be dipped into a refractory slurry then coated with dry refractory grains, over and over, until the desired shell thickness is obtained. Typically, shells are gradually built up to a thickness of approximately ⅛ inch or more to attempt to prevent defects from appearing in the final part. Such defects typically result from the shell shrinking, sagging or cracking. It is not uncommon in industry to use seven or more layers per shell. For some applications, the coats are applied with conventional manual dipping, but for many applications, including larger volume industrial applications, such manual dipping is prohibitively impractical. As a result, costly robotic manipulators may be required for dipping, thus serving as another barrier to those users who could otherwise effectively employ investment casting methods.

Overall, the process of shell building is time consuming because each coat of slurry (each with a corresponding coat of refractory grains) must be air-dried prior to the application of subsequent coats. Notably, in this regard, known shells cannot be baked at elevated temperatures for extended periods of time without compromising the integrity of the cured shell. In the end, the process of dipping, air drying, and redipping requires twenty-four to forty-eight hours or more to complete.

After drying, the shell is heated to at least the melting or burning point of the substrate (i.e., pattern). During this step, the substrate is melted or burned away leaving only the shell and any residual substrate. The shell is then heated to a temperature high enough to flash off the residual substrate which remains in the shell.

Before the shell has cooled significantly, the molten metal will be poured into it. Various methods are used to introduce molten metal into shells including gravity, vacuum pressure, and centrifugal methods. Notably, a shell material that has a low thermal conductivity will require a lower temperature of molten metal than one that does not have a low thermal conductivity. As understood in the art, pouring molten metal at a lower than typical temperature facilitates producing parts with more detail, and yields less oxidation. Therefore, a shell material that retains more heat is typically preferred.

Upon cooling and solidification of the molten metal, the casting shell may then be removed from the casting in conventional fashion such as by hammering or sand blasting. After the shell is removed from the casting, the casting may require a cleaning or finishing step.

More specifically, in addition to physical dimensional defects, if chemicals within a shell react with the molten metal, oxides or scaling typically will be formed and must be removed. In conventional investment casting, bead blasting or other methods of abrasion are often used to remove any oxidation, flashing and/or residual shell material from the part.

Due to economic pressures, an investment casting method that is quicker than known methods, yet accurate, was desired. To decrease the cost of producing investment cast parts, the time between creating the shell and the time that the molten metal is poured into the shell, or the "pattern-to-pour" cycle time, should be minimized. Additionally, the part as cast must be free from defects in order to minimize the need for costly post-casting machining and cleanup. Furthermore, to open the technique up for use by parties with limited budgets, the need for expensive capital equipment associated with current investment casting materials and techniques should preferably be reduced or eliminated.

In addition, a shell material that does not crack or distort was desired to reduce clean-up and post-casting machining. Any such material and/or method would preferably minimize the amount of equipment needed to produce the investment cast parts in high and low volume applications, and provide a safe working environment. And, health risks should be minimized by providing a material and method that does not require the application of dry refractory grains, thus essentially eliminating airborne refractory material.

SUMMARY OF THE INVENTION

The preferred embodiment overcomes the drawbacks of conventional systems by providing an investment casting shell material and method that can create a casting shell in as little as one coat, has no step that would require the application of dry materials, can withstand elevated temperatures, and hardens in a short amount of time to minimize pattern-to-pour cycle times.

According to a first aspect of the preferred embodiment, a composition for use in producing an investment casting shell includes a slurry having a plurality of particles of varying size. Notably, some of the particles are larger than 100 mesh.

According to another aspect of this preferred embodiment, the slurry includes colloidal silica, and the colloidal silica is 40% colloidal silica. Moreover, the slurry includes zircon flour in a range of about 200 mesh to 350 mesh.

In yet another aspect of this preferred embodiment, the slurry includes silicon carbide, primarily for heat retention, that is in a range of about 100 mesh to 300 mesh. The silicon carbide is preferably in a range of about 6% to 12% of the slurry by weight.

According to a still further aspect of this preferred embodiment, a viscosity of the slurry is greater than about 2500 centipoise (cps). Preferably, the viscosity is greater than 100,000 cps.

According to yet another aspect of the preferred embodiment, a composition for use in producing an investment casting shell, the composition comprising a slurry having a viscosity greater than 2500 cps.

In another aspect of the preferred embodiment, a composition for use in roducing an investment casting shell includes a slurry that is usable for at least six hours without generally continuous agitation.

In a further aspect of the preferred embodiment, a method of investment casting of a pattern includes applying a shell material slurry to the pattern, wherein the slurry includes particles of varying size, and wherein some of the particles being greater than about 100 mesh.

According to another aspect of the preferred embodiment, the method further includes allowing the applied slurry to harden into a shell. Thereafter, the method includes filling the shell with a molten metal in less than about twenty-four (24) hours from completion of the applying step.

In another aspect of this embodiment, the filling step is performed in less than about six hours from completion of the applying step.

According to yet another aspect of the preferred embodiment, a method of casting includes applying a face coat to a pattern. Then the face coat is at least partially dried. The method next includes coating the pattern with a slurry composition to create a coated pattern. The method also includes allowing the coated pattern to harden into a shell, and filling the shell with a molten metal. Then, the molten metal is allowed time to solidify into an article, and the shell is removed from the article.

According to a still further aspect of this preferred embodiment, the face coat includes colloidal silica, zircon flour, and fused silica.

In yet another aspect of the preferred embodiment, an investment casting method includes applying a shell material to a pattern. Then, the coated pattern is allowed to harden into a shell to create a coated pattern. After removing the pattern from the shell, the shell is filled with a molten metal. Then, the method includes allowing the molten metal to solidify into an article. Once solidified, the shell is removed from the article. In this case the shell material is a slurry including colloidal silica, zircon flour, and fused silica.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

Figure 1:
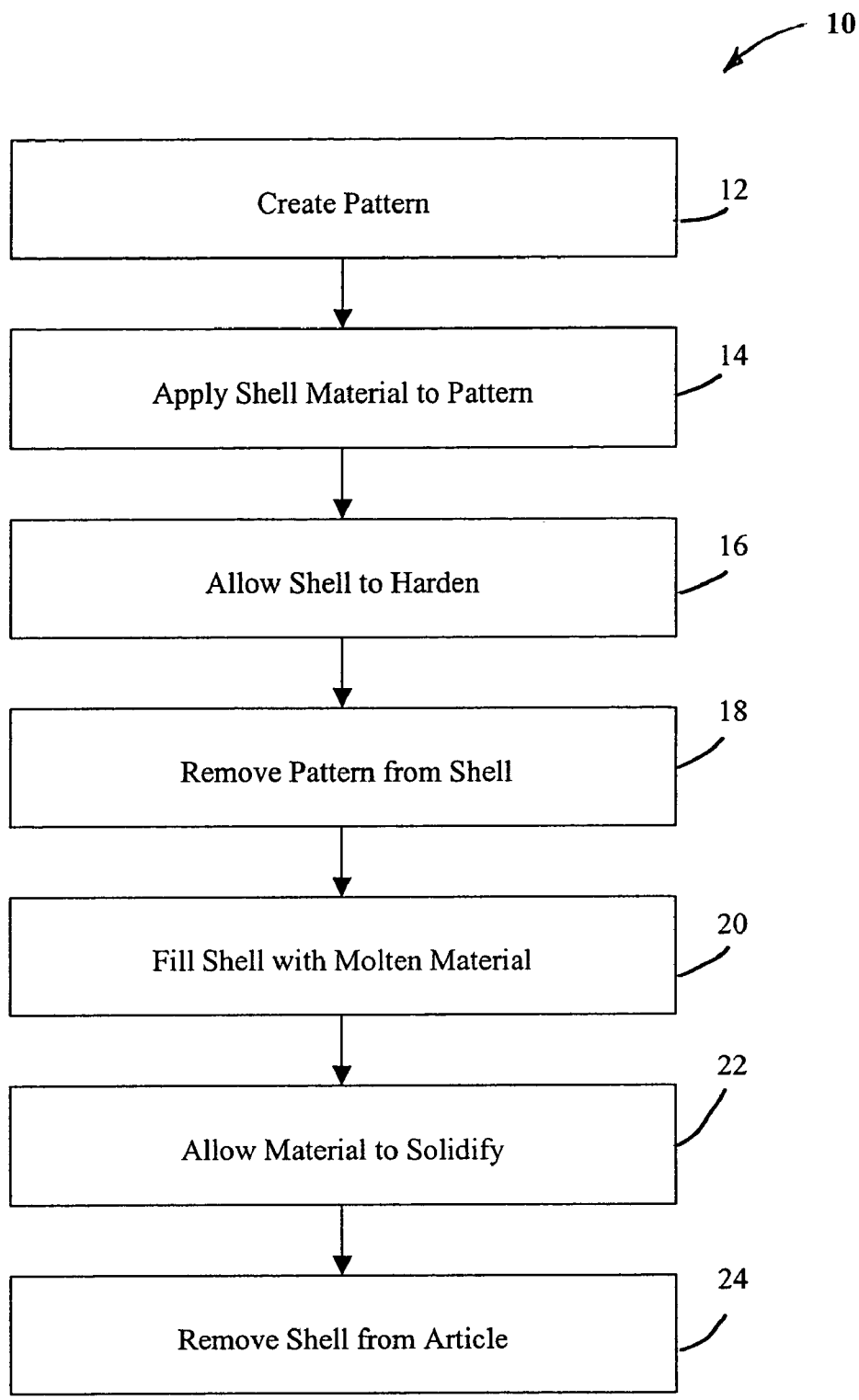
FIG. 1 is a flow diagram of a preferred embodiment of the present invention.
Figure 2:
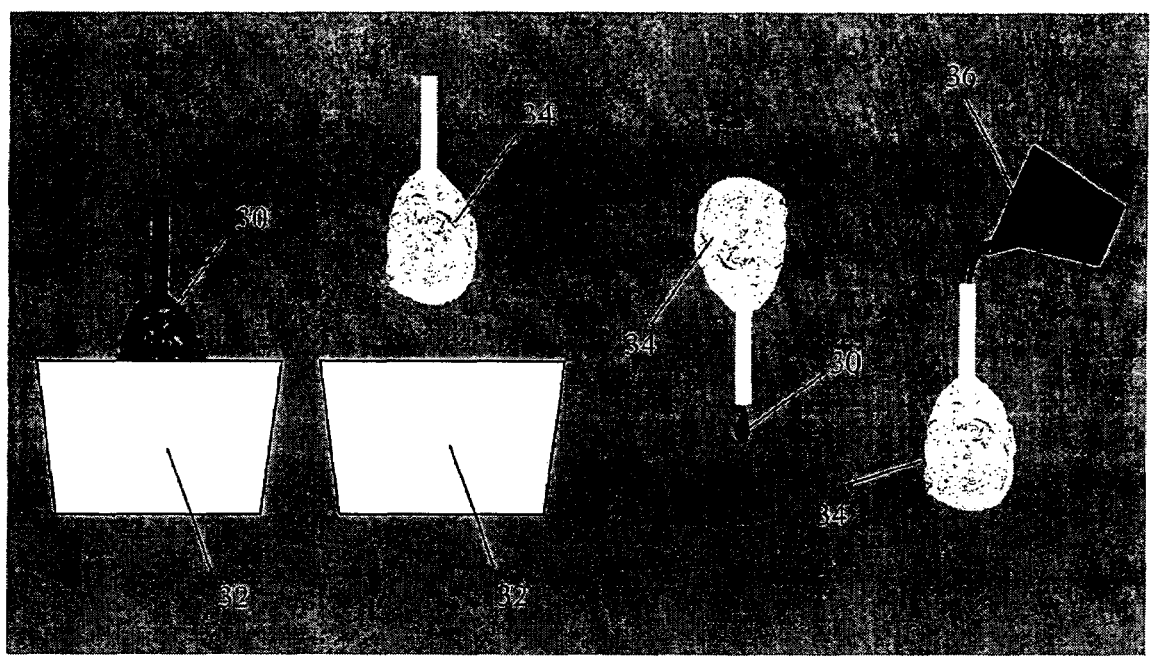
FIG. 2 is a schematic diagram of a preferred embodiment of the present invention.

Referring to FIGS. 1 and 2, a method 10 of investment casting using an inventive casting shell that can be applied in as little as one coat without exposing the user to airborne refractory particles, is shown and illustrated. Initially, a pattern 30 (FIG. 2) is formed according to the user's specifications in Block 12. Note that the pattern 30 can be any type of part or article, and preferably is formed from a material readily removed under elevated temperatures. Although the pattern is preferably formed from wax, wax is not necessary. The pattern may be formed from any material that is adapted to being removed from the resultant shell material during the investment casting process, e.g., at elevated temperatures corresponding to the melting point associated with the pattern. For example, the pattern may be made of foam, paper products, etc.

In Block 14, a colloidal refractory shell material according to the preferred embodiment is applied to the pattern 30. As shown in FIG. 2, pattern 30 may be dipped in a slurry 32 contained in a container. Alternately, the slurry may be brushed or hand packed on the pattern, for example. Contrary to conventional investment casting slurries, slurry 32 preferably has the consistency of conventional cake frosting. More particularly, whereas conventional slurries have a viscosity of about 2500 centipoise, the slurry of the preferred embodiments is much greater, and can be as much as 100,000 centipoise or more (i.e., unable to pass through a conventional zahn cup). Pattern or substrate 30 is coated with the slurry material in as little as one coat, without requiring any application of dry refractory powders to form a coated pattern 34. The coat is at least one-quarter of an inch thick and preferably about one-half of an inch thick. Coated pattern 34 is then allowed to cure or harden in Block 16. Preferably, this coated pattern is air-dried over a four to six hour drying period. Fans may be used as part of the air drying process. In addition, the coated pattern may be exposed to heat to facilitate the curing process. This is unique to the present shell material and investment casting process which allows the shell to be exposed to a range of temperatures, including highly elevated temperatures, specifically in a range from about room temperature to about 1850° F., for extended periods of time without compromising the integrity of the resultant shell.

Once the mechanical water (which comprises a small portion of the shell, typically less than 1% using the shell material of the preferred embodiments) is removed by this drying process, the pattern may be removed from the shell in Block 18. Preferably, the investment mold is exposed to heat (anywhere between about room temperature to 1850° F.) in order to evacuate the pattern, as shown in the third illustration from the left in FIG. 2. After the pattern has been eliminated, the resultant mold is prepared for molten metal casting in conventional fashion. Note that the pattern may be removed from the shell upon pouring the molten metal of the next step of the investment casting process, if the pattern is made from an appropriate combustible material such as foam. Notably, in this regard, because the metals are poured at such high temperatures, for example, bronze is poured at 2200° Fahrenheit, iron is poured at 2550° Fahrenheit, the typical 1850° Fahrenheit "burn out" to remove the pattern and cure the shell may not be required.

In Block 20, the hollow colloidal refractory shell is filled with molten metal 38 and is allowed to cool and solidify in Block 22. Thereafter, depending upon the metal or casting medium used, the colloidal refractory shell is removed. This step, in Block 24, may be accomplished by hammering, sandblasting, bead blasting, or any other suitable method that preserves the resultant casting. In this regard, for example, metal casting may be shot blasted, while an acrylic medium typically would require an appropriate chemical solution, such as sodium hydroxide, to remove the refractory shell.

Overall, the method and corresponding shell composition allow the user to create castings of patterns with extreme detail. Moreover, it allows the user to physically generate quality castings in less than a twenty-four hour "pattern-to-pour" cycle time (defined as the time elapsed from application of the shell material to the pattern (Block 14) to filling the hardened shell with molten metal (Block 20)), and in most cases less than a six hour pattern-to-pour cycle time. This is opposed to traditional investment casting methods that typically require a minimum of twenty-four hours of preparation time prior to being able to pour the molten metal.

In addition, as described further below, the resultant shells of the preferred embodiments retain heat at greater amounts than traditional shells, thus allowing the metal to be poured at lesser temperatures, thus yielding higher quality (greater detail, etc.) castings, as described previously. Moreover, the "shelf life" of the slurry is significantly greater than traditional investment casting slurries given that the slurry can sit in a container and not settle out or harden, in direct contrast to known slurries that must be continuously blunged to maintain their integrity as a slurry.

Another benefit of the preferred embodiment is that the byproducts associated with the colloidal refractory shell can be hammer milled or sieved, for instance, to the proper mesh size and reused at nearly one hundred percent in future production runs. As a result, the colloidal refractory shell material is environmentally friendly, unlike traditional investment casting shell materials that typically become landfill material. One key to realizing these investment casting improvements is the composition of the refractory shell material, which will be described in detail immediately below.

To achieve the above-noted benefits, the present preferred composition of the investment casting shell material is as follows. Initially, a known refractory composition having the following components including $Al_2O_3$ at about 73.5% (in the range of about 71.5–75%), SiC at about 17.5% (in the range of 16.5–19.5%), $SiO_2$ at about 6.5% (in a range of about 4.5%–8.7%), CaO at about 0.1% (in a range of about 0.0%–0.5%), $Fe_2O_3$ at 0.3% (in a range of about 0.2%–0.5%), and $TiO_2$ at 2% (in a range of about 1.5%–2.5%), which will be referred to herein as "HP4" or the "known refractory") can be used to provide a shell material that achieves at least some of the benefits discussed above. However, this simple composition, when used in a slurry for the shell material, has drawbacks that will become clear with the below discussion. Therefore, the alternate, more preferred compositions described herein were derived with the corresponding benefits discussed below.

First, beginning with an amount of the known refractory, one alternate composition of the preferred embodiment includes removing all large chunks of material from the known refractory so that the remaining material has a consistency similar to baking flour. In this regard, sieving the known refractory with a "4 mesh" sieve was found to be ideal in the following recipe. The term "mesh" is used hereinafter and refers to the number of openings per inch of a sieve, thus providing a measure of the size of the corresponding particles being described. For example, the term "4 mesh" is a particle size measurement that may be referred to as its Tyler equivalent. In this case, 4 mesh refers to an opening size of 4.76 mm, or 0.187 inch.

A shell material recipe for the slurry for the preferred embodiment combines the modified known refractory with other ingredients as follows: about 40–42% (preferably about 41%) modified known refractory (4 mesh); about 0.0–0.1% (preferably about 0.05%) Plaster of Paris; about 19–21% (preferably about 20.0%) 120 fused silica, about 2–3% (preferably about 2.5%) perlite, and about 34.5–37.5% (preferably about 36.0%) colloidal silica (40% solution). This mixture, when incorporated in the present investment casting process, allows the user to, among other methods, either dip or brush the wax pattern such that the resultant shell hardens in a short amount of time, e.g., within about seven minutes.

The colloidal silica is provided as a liquid binder providing a vehicle for the other dry materials to mix into. In addition, the colloidal silica acts as a fluxing agent at high temperatures. Notably, colloidal silica has a pH of about 9+. In the event that the pH is changed too much by using reactive material in the mixture, the mixture will set up too fast and will be non-usable. Generally, the colloidal silica used in this invention is preferably 40% $SiO_2$ by weight and 0.5% $Na_2O$ by weight, in a water base. However, either 30% or 40% colloidal silica, for example, may be used with generally equal results. Again, colloidal silica is a colloid of amorphous silica particles in a suspension of ionized sodium.

The 120 fused silica is employed to provide a refractory material that is a non-reactive filler. Specifically, in this regard, the fused silica will not react with, and thus will not alter, the pH of the colloidal silica. Fused silica therefore provides a good filler. Moreover, the fused silica also has good thermal shock resistance. The fused silica used in the preferred embodiments is preferably in a range of 90–150 mesh, and more preferably 120 mesh.

Note that the Plaster of Paris used is a hemi-hydrated calcium sulfate ($CaSO_4$ and ½ $H_2O$) that is employed to improve the brushability of the slurry. Plaster of Paris typically includes SiO at 0.94%, $Fe_2O_3$ at 0.28%, $Al_2O_3$ at 0.69%, $CaSO_4$, ½$H_2O$ at 97.97%, and MgO at 0.17%.

Finally, perlite is employed as a feldspathic filler. In particular, perlite is a reactive material and can change the pH of the colloidal silica as so desired. For example, perlite can be used to cause acceleration of the setting of the shell material. As an alternative, substitutes such as Herculon® fiber, comprising very fine particles, may be supplied (e.g., by vibration) to achieve similar effects. The perlite that is used in this invention is preferably either a fine 60 grit or a medium 30 grit mesh. Perlite is a naturally occurring silicous volcanic rock which is approximately 75% $SiO_2$ and 15% $Al_2O_3$. Perlite is used in the preferred embodiment as a filler due to its larger particle size relative to the other fillers.

The amount of plaster or feldspathic filler that is included within the slurry may be adjusted to modify the setting time. Too much plaster may cause the shell to cure within three to four minutes, which does not provide sufficient working time for the applications contemplated by the preferred embodiments, with even approximately seven minutes being too short for some applications. In addition, as an alternative to the plaster, perlite, and even the HP4 for altering the allowed working time of the slurry, pure chemicals such as MgO and CaO may be used.

In other preferred embodiments that do not employ the known refractory, the shell material slurry includes a combination of colloidal silica, zircon powder, and fused silica with a variety of other materials. These materials include at least some of the following: colloidal silica, latex colloidal silica, zircon powder, fused silica, alumina, welan gum, perlite, Mulcoa 60, frit 3124, corn starch, Kelco-crete® and silicon carbide. Each of these components and their corresponding functions will be described in detailbelow, with preferred embodiments of the slurry illustrated in Table 1.

Zircon flour is a refractory component. The zircon flour used in this invention ($ZrSiO_4$) is a fine powder, preferably in a range of 200–350 mesh, and more preferably 325 mesh. Zircon flour is used in the present invention to reduce the amount of oxidation that occurs during the molten metal pouring process. Zircon flour has a high density which facilitates allowing the shell material to settle into the finer details of a pattern. Additionally, the fine particle size of zircon flour aids in keeping the slurry of the preferred embodiment in suspension, i.e., sagging, which can compromise the quality of the cast as understood in the art, is minimized. Moreover, in this regard, the fine particles also prevent settling of the slurry when not in use. Therefore, slurry shelf life is greatly improved without continuous blunging, as previously discussed is a desired feature.

Alumina, such as tabular alumina, is a non-reactive refractory material that provides larger particle sizes for the shell mixture. It typically has low porosity and a high density and provides an inexpensive additive. Tabular aluminas are preferably 50–325 mesh and are produced by sintering ball-formed calcined alumina, then crushing the talublar alumina balls.

Next, Mulcoa 60® is a commercially manufactured fused material. It is a fritted material, which introduces a variety of materials, including alumina and silica, into the mix. Mulcoa 60 is a refractory calcine and is non-reactive. Moreover, it is a high mullite chamotte produced by calcining low alkali clays. The composition of Mulcoa 60 is approximately 60% $Al_2O_3$ and 36% $SiO_2$. Mulcoa 60 is a fused material that is relatively fine and thus facilitates suspension. Other fritted materials, such as what is known as "frit 3134" are employed in some of the examples of Table 1. Generally, these materials, when hardened into the shell, individually and collectively provide a fused matrix that allows the shell material to be readily cracked upon completion of the casting process.

Silicon carbide (SiO) is a crystalline compound of silicon and carbon, and is provided for its high temperature strength properties, with low thermal expansion and for its ability to allow the shell to retain heat for longer periods of time. These features allow the molten metal to be poured at a cooler temperature. Again, when the molten metal is poured at a cooler temperature, metal oxidation is reduced and greater part detail can be provided. Also, safety is improved, and energy use is decreased. It is preferably about 100–300 mesh, and more preferably, about 200 mesh.

Corn starch is provided to promote thickness of the mixture and to provide greater adherence of the mixture to the pattern, working almost as a glue. Welan gum, such as Kelco-crete®, may be used in addition, or as an alternative, to corn starch. Another alternative that could be used in this regard is carboxy methyl cellulose (CMC). Nevertheless, materials such as corn starch are perishable. Therefore, Kelco-crete® is preferred.

Finally, the latex colloidal silica is similar to the colloidal silica but includes 3% latex which primarily acts to prevent cracking during shell curing, and render the slurry more elastic and thus more brushable. Alternatively, styrenes may be used as a substitute to provide a more paint-like product. The latex colloidal silica used in the preferred embodiments is preferably 30% $SiO_2$ by weight in water with a latex solution.

By adjusting the percentages of the various components noted above, the properties of the preferred embodiments discussed previously have been achieved. Examples of preferred components for the slurry and corresponding workable ranges, will hereinafter be discussed.

Table 1 provided below illustrates, by way of example, nine different sample compositions of the present invention. Component quantities are given by way of weight percentages.

TABLE 1

| | Composition by Weight (wt. %) | | | | | | | | | | |
|---|---|---|---|---|---|---|---|---|---|---|---|
| | Colloidal Silica | Latex Colloidal Silica (30%) | Zircon Flour (325 mesh) | Fused Silica (120 mesh) | Mulcoa 60 (200 mesh) | Alumina (325 mesh) | Alumina (50–200 mesh) | Silicon Carbide (200) | Frit 3124 | Kelco-crete | Corn Starch |
| Ex. 1 | 24.2 | 0 | 15.2 | 12.9 | 10.7 | 10.7 | 10.7 | 6.8 | 6.8 | .75 | .75 |
| Ex. 2 | 6.7 | 22.8 | 33.6 | 20.1 | 16.8 | 0 | 0 | 0 | 0 | 0 | 0 |

TABLE 1-continued

Composition by Weight (wt. %)

|  | Colloidal Silica | Latex Colloidal Silica (30%) | Zircon Flour (325 mesh) | Fused Silica (120 mesh) | Mulcoa 60 (200 mesh) | Alumina (325 mesh) | Alumina (50–200 mesh) | Silicon Carbide (200) | Frit 3124 | Kelco-crete | Corn Starch |
|---|---|---|---|---|---|---|---|---|---|---|---|
| Ex. 3 | 5.7 | 19.5 | 28.7 | 17.2 | 0 | 14.4 | 14.4 | 0 | 0 | 0 | 0 |
| Ex. 4 | 7.1 | 24.1 | 35.5 | 21.3 | 0 | 0 | 0 | 12.1 | 0 | 0 | 0 |
| Ex. 5 | 4.6 | 15.7 | 23.1 | 13.9 | 11.6 | 0 | 23.1 | 7.9 | 0 | 0 | 0 |
| Ex. 6 | 24.2 | 0 | 33.3 | 19.7 | 10.6 | 0 | 0 | 0 | 4.5 | 0.7 | .07 |
| Ex. 7 | 24.2 | 0 | 26.5 | 16.7 | 0 | 13.6 | 0 | 0 | 3.8 | 0.8 | 0.8 |
| Ex. 8 | 24.2 | 0 | 35.6 | 21.2 | 0 | 0 | 0 | 12.1 | 5.3 | 0.8 | 0.8 |
| Ex. 9 | 24.2 | 0 | 20.4 | 12.9 | 10.6 | 0 | 20.4 | 6.8 | 3.0 | 0.8 | 0.8 |

In the Table 1 examples, the component ranges are: colloidal silica at about 0.0%–24.2%, latex colloidal silica at about 0.0%–24.4% (with the overall colloidal silica component preferably being at least 20% by volume), zircon flour at about 15.2%–35.6%, fused silica at about 12.9%–21.2%, Mulcoa 60 at about 0.0%–16.8%, tabular alumina (325 mesh), at about 0.0%–14.4%, tabular alumina (50–200 mesh) at about 0.0%–23.1%, silicon carbide at about 0.0%–12.1%. Also, although preferred mesh sizes are noted, preferred usable ranges include: zircon flour (200–350 mesh), fused SiO$_2$ (90–150 mesh), Mulcoag 60 (180–240 mesh), SiC (100–300 mesh).

With respect to the different examples, the first example (Ex. 1) is directed to a back coat that is an alternate of the slurry recipes including the known refractory discussed initially, with none of the known refractory material included. (Note that one element is missing in Ex. 1 of Table 1, Mulgrain is preferably included at about 3%.) Examples two through five (Exs. 2–5) are directed to alternate preferred recipes, where Ex. 4 is preferred if heat retention (e.g., pouring at cooler temperatures) is a primary concern, while Ex. 5 provides a slightly more expensive option that provides a high quality shell with the benefits of the preferred embodiments discussed herein, at the cost of additional materials which further diversify particle size and thus aid suspension. Examples six through nine (Exs. 6–9) correspond generally to examples 2–5, respectively, but are modified slightly, generally for increased adhesive properties useful, for instance, when the application step is performed by, for instance, hand packing.

Figure 3:
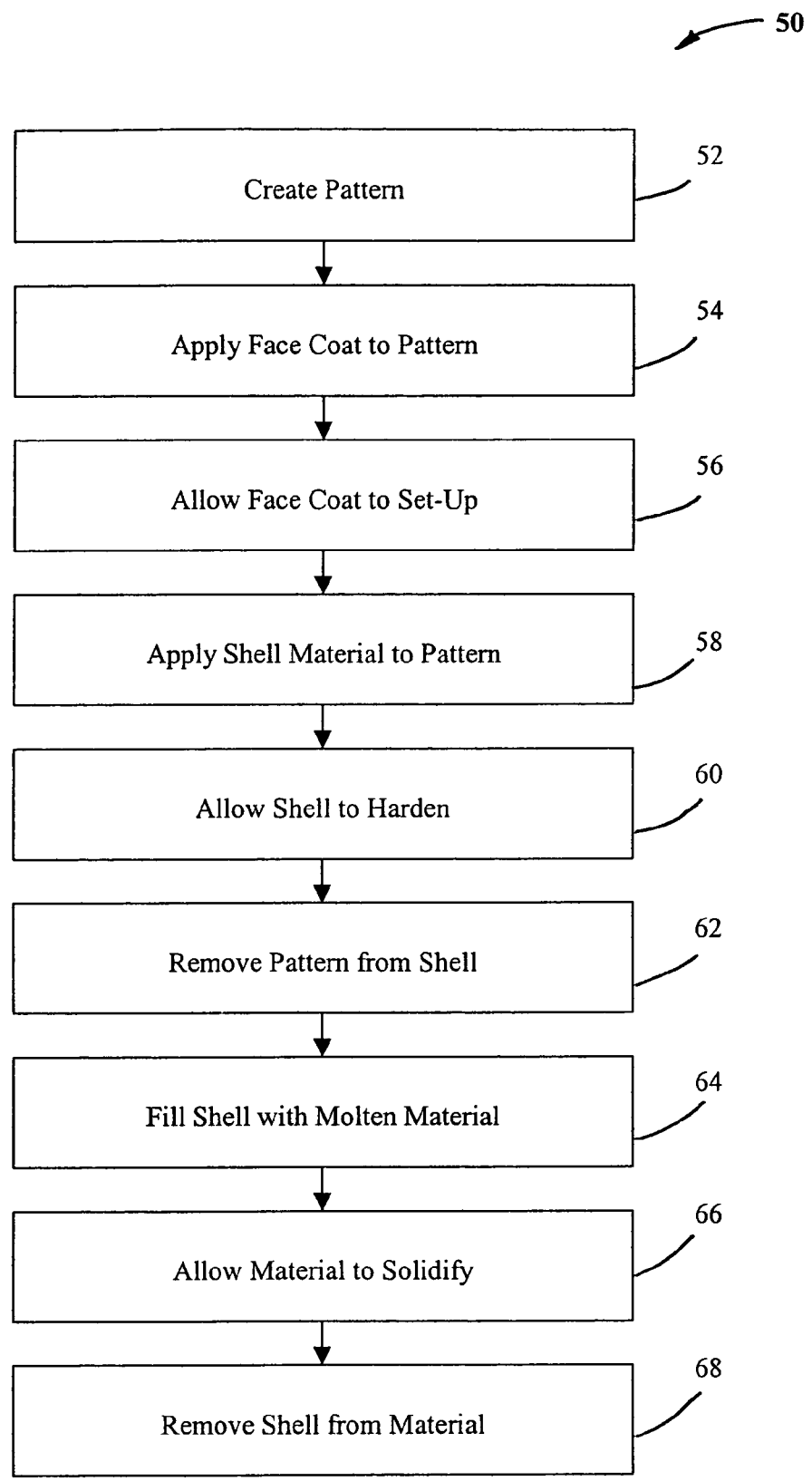
FIG. 3 is a flow diagram of another preferred embodiment of the present invention.

Referring next to FIG. 3, an optional face coat may be applied with an alternate preferred embodiment. A method 50 according to this alternative includes initially creating a pattern of the part to be cast at Block 52. Then, contrary to the previous embodiment, a face coat is applied to the pattern as a first coat in Block 54. Again, the coat may be applied using any of a variety of methods including spraying, hand packing, brushing, etc. Then, in Block 56, the face coat is allowed to set up. Preferably, this is a relatively thin coat that sets within a short amount of time, as low as three to five minutes. Next, in Block 58, the inventive shell material is applied to the pattern. Thereafter, the shell is allowed to harden in Block 60. Subsequent coats may be used, but are not preferred. Thereafter, in Block 62, the pattern is removed from the colloidal refractory shell as described previously.

In Block 64, the shell is filled with a molten material to form the part that is being cast. Once the material solidifies in Block 66, the shell is removed from the cast part in Block 68 according to the methods described previously.

A face coat (Block 54) may be used in situations where, for example, there is a concern that the molten material would otherwise react with materials in the casting shell. When a face coat is used, it is applied directly to the pattern and allowed to set-up for a short time prior to applying the backup shell material to the face-coated pattern. One such face coat composition uses colloidal silica, zircon, fused silica, and welan gum. More particularly, the preferred face coat composition includes about each of the following: about 4–8% colloidal silica, about 14–21% latex colloidal silica (and at most about 24% colloidal silica total), about 31–33% zircon flour (about 325 mesh), about 16–18% fused SiO$_2$ (about 120 mesh), about 6% frit 3124, about 0.0% to 1% Kelco-crete®, and about 0.0% to 1% corn starch, in a water base (about 20%).

Figure 4:
FIG. 4 is a photo of a casting and its shell that were made using the composition and method of the preferred embodiment.

A resultant cast part is shown in FIG. 4, where a metal 70 has hardened to a sculpture. In this case, a face coat 72 and a back coat 74 were applied as part of the two-step process 50 described above. The benefits of the preferred embodiments were realized in completing this cast, including fine part detail and unprecedented pattern-to-pour cycle time.

Reviewing the benefits of the preferred embodiments, it is notable that the slurry compositions harden quickly relative to conventional materials and methods. And, the composition and method of the preferred embodiments allow an investment shell to be created, in some cases, in as little as three hours. Again, conventional methods require that patterns be dipped into a slurry, then sprinkled with a refractory sand, allowed to dry, and redipped six or more times. Such methods can require three hours or more per layer of stuccoed slurry. And, typically, a minimum of four layers of stuccoed slurry are required to make a casting shell. Therefore, the total time required to produce a shell can be twenty-four hours or more.

Moreover, conventional compositions and methods for creating investment casting shells require that slurries be continually mixed in order to prevent heavier components from settling out of the slurry. The present composition and method achieves a slurry with a consistency similar to cake frosting which remains stable, without mixing, for long periods of time.

Due to the consistency of the slurry, it is possible to apply the slurry to a pattern using many methods including brushing, spraying, dipping, or packing. When hand packing is the desired method of application, some of the preferred embodiments utilize corn starch to thicken the slurry and prevent sagging of the material when it is applied to a pattern. Again, alternatively, welan gum may be used in place of corn starch to achieve a similar effect. Notably, due to the issue of microbial contamination, the use of welan gum allows the slurry to have a longer shelf life than if corn starch is used. If cornstarch is used, it may be desirable to add an anti-microbial agent into the slurry to retard the growth of bacteria.

Other benefits achieved by the preferred embodiments inlcude utilizing materials only in a slurry form, thus eliminating dangerous airborne particles such as airborne silica. This potential health risk is avoided by using only wetted materials. A further benefit is that expensive air-handling equipment and ventilators are not needed during the shell creation process. Another desirable result of using a one-coat shell material is a dramatic reduction in the equipment required to automate the process. It is commonplace in the investment casting industry to use expensive robotic arms to repeatedly dip and coat patterns. Due to its ability to create a shell in one coat, the preferred embodiments eliminate the need for cumbersome and time consuming multiple shell material applications. The present slurry and methods obviate the need for complex and expensive production systems such as robotic manipulators.

Moreover, in at least some of the preferred embodiments, silicon carbide is used to provide the casting shell with improved heat retaining ability. This improved heat retaining ability allows the casting material to be poured at a lower temperature. Pouring a material at a lower temperature drastically reduces the amount of energy required to melt and sustain the casting material's pour temperature. Thus, energy expenses are reduced. Moreover, a lower pour temperature typically yields less occurrences of and the severity of surface oxidation. Again, when surface oxidation is minimized, post-casting cleanup operations are significantly reduced or eliminated.

Although the best mode contemplated by the inventors of carrying out the present invention is disclosed above, practice of the present invention is not limited thereto. For example, although the preferred embodiments have been described in terms of traditional investment casting, methods and apparatus, the composition can be used in other casting methods, such as those employing a cope-and-drag set up. It will be manifest that various additions, modifications and rearrangements of the features of the present invention may be made without deviating from the spirit and scope of the underlying inventive concept.

What is claimed is:

1. A mold-forming composition for use in producing an investment casting shell, the mold-forming composition comprising:
   a colloidal silica providing 20.3% to 37.5% of the mold-forming composition's weight;
   a zircon flour providing 15.2% to 35.6% of the mold-forming composition's weight, wherein most of the zircon flour has a zircon particle size of 200 mesh to 350 mesh;
   a fused silica providing 12.9% to 21.3% of the mold-forming composition's weight, wherein most of the fused silica has a silica particle size of 90 mesh to 150 mesh;
   an alumina providing 6.4% to 27.8% of the mold-forming composition's weight, wherein most of the alumina has an alumina particle size of 50 mesh to 325 mesh; and
   a thickness-promoting material providing 0.7% to 2% of the mold-forming composition's weight, wherein the following is true:
   a) the fused silica plus the alumina combined provide 21.2% to 40.7% of the mold-forming composition's weight,
   b) the fused silica plus the zircon flour combined provide 28.1% to 56.8% of the mold-forming composition's weight, and
   c) the zircon flour plus the alumina combined provide 35.6% to 47.2% of the mold-forming composition's weight.

2. A mold-forming composition for use in producing an investment casting shell, the mold-forming composition comprising:
   a colloidal silica providing 20.3% to 37.5% of the mold-forming composition's weight;
   a zircon flour providing 15.2% to 35.6% of the mold-forming composition's weight, wherein most of the zircon flour has a zircon particle size of 200 mesh to 350 mesh;
   a fused silica providing 12.9% to 21.3% of the mold-forming composition's weight, wherein most of the fused silica has a silica particle size of 90 mesh to 150 mesh;
   an alumina providing 6.4% to 27.8% of the mold-forming composition's weight, wherein an appreciable amount of the alumina has an alumina particle size of substantially 200 mesh; and
   a thickness-promoting material comprising a mixture of corn starch and a polysaccharide binder, wherein the thickness-promoting material provides 0.7% to 2% of the mold-forming composition's weight, wherein the following is true:
   a) the fused silica plus the alumina combined provide 21.2% to 40.7% of the mold-forming composition's weight,
   b) the fused silica plus the zircon flour combined provide 28.1% to 56.8% of the mold-forming composition's weight, and
   c) the zircon flour plus the alumina combined provide 35.6% to 47.2% of the mold-forming composition's weight.

3. A mold-forming composition for use in producing an investment casting shell, the mold-forming composition comprising:
   a colloidal silica providing 20.3% to 37.5% of the mold-forming composition's weight;
   a zircon flour providing 15.2% to 35.6% of the mold-forming composition's weight, wherein most of the zircon flour has a zircon particle size of substantially 325 mesh;
   a fused silica providing 12.9% to 21.3% of the mold-forming composition's weight, wherein most of the fused silica has a silica particle size of substantially 120 mesh;
   an alumina providing 6.4% to 27.8% of the mold-forming composition's weight, wherein an appreciable amount of the alumina has an alumina particle size of substantially 200 mesh; and a thickness-promoting material comprising a mixture of corn starch and a polysaccharide binder wherein the thickness-promoting material provides 0.7% to 2% of the mold-forming composition's weight, wherein the following is true:
  a) the fused silica plus the alumina combined provide 21.2% to 40.7% of the mold-forming composition's weight,
  b) the fused silica plus the zircon flour combined provide 28.1% to 56.8% of the mold-forming composition's weight,
  c) the zircon flour plus the alumina combined provide 35.6% to 47.2% of the mold-forming composition's weight, and
  d) the mold-forming composition has a viscosity greater than 10,000 cps.

* * * * *